United States Patent
Li et al.

(10) Patent No.: US 11,196,852 B2
(45) Date of Patent: Dec. 7, 2021

(54) MOBILE TERMINAL AND DROP PROTECTION METHOD THEREOF

(71) Applicants: BOE Technology Group Co., Ltd., Beijing (CN); Hefei BOE Optoelectronics Technology Co., Ltd., Hefei (CN)

(72) Inventors: Peng Li, Beijing (CN); Jiong Huang, Beijing (CN); Lele Han, Beijing (CN); Wei Xu, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 692 days.

(21) Appl. No.: 16/075,280

(22) PCT Filed: Feb. 8, 2018

(86) PCT No.: PCT/CN2018/075869
§ 371 (c)(1),
(2) Date: Aug. 3, 2018

(87) PCT Pub. No.: WO2018/205703
PCT Pub. Date: Nov. 15, 2018

(65) Prior Publication Data
US 2021/0203764 A1    Jul. 1, 2021

(30) Foreign Application Priority Data
May 9, 2017    (CN) .......................... 201710323016.X (51) Int. Cl.
*H04B 1/38*    (2015.01)
*H04M 1/18*    (2006.01)
(Continued)

(52) U.S. Cl.
CPC .......... *H04M 1/185* (2013.01); *G06F 1/1656* (2013.01); *H04M 1/72454* (2021.01); *H04M 2250/12* (2013.01)

(58) Field of Classification Search
CPC .... H04M 1/185; H04M 1/68; H04M 1/72454; G06F 1/1656
See application file for complete search history.

(56) References Cited

U.S. PATENT DOCUMENTS

| 7,059,182 | B1 | 6/2006 | Ragner |
| 7,933,123 | B2 * | 4/2011 | Wang .................. H04B 1/3888 361/679.56 |

(Continued)

FOREIGN PATENT DOCUMENTS

| CN | 101399860 A | 4/2009 |
| CN | 201282501 Y | 7/2009 |

(Continued)

OTHER PUBLICATIONS

First Office Action (including English translation thereof) of the priority application No. 201710323016.X dated Mar. 4, 2019.
(Continued)

*Primary Examiner* — Tuan Pham
(74) *Attorney, Agent, or Firm* — Fay Sharpe LLP (57) ABSTRACT

Provided are a mobile terminal and a drop protection method thereof. The mobile terminal includes a display panel, a middle frame, a rear shell, a protection module and a detection module; the middle frame being mounted in the rear shell; and the display being arranged on the middle frame. The protection module includes a buffer elastic block mounted on the middle frame and an elastic block control unit for controlling buffer elastic block to eject out if the mobile terminal is in a drop state. At the instant of dropping down to the ground, the buffer elastic block absorbs a generated momentum reduces instant impact stress of (Continued)

mobile terminal, thereby protecting modules, and preventing stress concentration. Since buffer elastic block is arranged on middle frame, the mobile terminal is better protected, and damages to the screen and the internal modules caused by drop of the mobile terminal are be avoided.

20 Claims, 9 Drawing Sheets

(51) Int. Cl.
*H04M 1/72454* (2021.01)
*G06F 1/16* (2006.01)

(56) References Cited

U.S. PATENT DOCUMENTS

| | | | | |
|---|---|---|---|---|
| 10,506,990 | B2 * | 12/2019 | Lee | A61B 5/7225 |
| 10,687,607 | B2 * | 6/2020 | Li | G05B 15/02 |
| 2007/0236358 | A1 * | 10/2007 | Street | G08B 1/08 |
| | | | | 340/628 |
| 2012/0250276 | A1 * | 10/2012 | Nakajima | G06F 1/1658 |
| | | | | 361/752 |
| 2016/0309866 | A1 | 10/2016 | Kay et al. | |
| 2017/0355507 | A1 * | 12/2017 | Rivellini | H01F 7/122 |

FOREIGN PATENT DOCUMENTS

| | | |
|---|---|---|
| CN | 101765346 A | 6/2010 |
| CN | 201947340 U | 8/2011 |
| CN | 102467627 A | 5/2012 |
| CN | 102638952 A | 8/2012 |
| CN | 202587078 U | 12/2012 |
| CN | 202856834 U | 4/2013 |
| CN | 203119975 U | 8/2013 |
| CN | 103530974 A | 1/2014 |
| CN | 103237097 B | 11/2015 |
| CN | 105472069 A | 4/2016 |
| CN | 105681501 A | 6/2016 |
| CN | 105847471 A | 8/2016 |
| CN | 106060212 A | 10/2016 |
| CN | 205618596 U | 10/2016 |
| CN | 106385478 A | 2/2017 |
| CN | 106603783 A | 4/2017 |
| CN | 106804098 A | 6/2017 |
| CN | 107094194 A | 8/2017 |
| JP | 2007214751 A | 8/2007 |

OTHER PUBLICATIONS

International Search Report dated May 4, 2018 in PCT/CN2018/075869 (untranslated).

* cited by examiner

MOBILE TERMINAL AND DROP PROTECTION METHOD THEREOF

This application is a 371 of PCT Patent Application Serial No. PCT/CN2018/075869, filed on Feb. 8, 2018, which claims priority to Chinese Patent Application No. 201710323016.X, filed with the State Intellectual Property Office on May 9, 2017 and titled "MOBILE TERMINAL AND DROP PROTECTION METHOD THEREOF", the entire contents of which are incorporated herein by reference.

TECHNICAL FIELD

The present invention relates to a mobile terminal and a drop protection method thereof.

BACKGROUND

With the development of the society, mobile terminals such as mobile phones, tablet computers and the like have become indispensable in life. During use of such products in people's daily life, it is inevitable that cases of slipping out of the hand or dropping will be occurred, resulting in that the screen or the rear shell of the mobile terminal may be damaged or broken, which affects the appearance of the mobile terminal; and further resulting in that the internal modules of the mobile terminal may also be damaged, such that the mobile terminal may not be used normally.

SUMMARY

There are provided in at least one embodiment of the present disclosure a mobile terminal and a drop protection method thereof. The technical solutions are as follows.

There is provided in at least one embodiment of the present disclosure a mobile terminal, comprising a display panel, a middle frame, a rear shell, a protection module and a detection module; wherein the middle frame is mounted in the rear shell, and the display panel is arranged on the middle frame; the protection module comprises a buffer elastic block and an elastic block control unit, the buffer elastic block is mounted on the middle frame, and the elastic block control unit is configured to control the buffer elastic block to eject out if the detection module detects that the mobile terminal is in a drop state.

Optionally, the elastic block control unit comprises a buffer spring and an electromagnetic drive limiting mechanism; one end of the buffer spring is connected to the buffer elastic block, the other end of the buffer spring is connected to the middle frame, the electromagnetic drive limiting mechanism is mounted on the middle frame, and the electromagnetic drive limiting mechanism is configured to seize or release the buffer elastic block.

Optionally, the electromagnetic drive limiting mechanism comprises an electromagnet, a connection spring and a limiting block; wherein the limiting block is provided with a ferromagnet cooperated with the electromagnet, and the buffer elastic block is provided with a limiting groove cooperated with the limiting block.

Optionally, the buffer elastic block comprises an elastic block body and two support arms extending from two sides of the elastic block body; and the buffer spring is connected to the elastic block body and is located between the two support arms.

Optionally, a section of the elastic block body parallel to the display panel is fan-shaped.

Optionally, the two support arms extend towards the two sides of the elastic block body along a bending direction of an arc surface of the elastic block body, and when the buffer elastic block is accommodated in the mobile terminal, an outer side wall of the buffer elastic block and an outer side wall of the mobile terminal are integrally connected and smoothly transitioned.

Optionally, the buffer elastic block is made of a flexible material.

Optionally, four corners of the mobile terminal are each provided with a buffer elastic block and an elastic block control unit.

Optionally, an ejection direction of the buffer elastic block is parallel to the display panel.

Optionally, four mounting grooves, corresponding to the four corners of the mobile terminal, are provided on the middle frame, and the buffer elastic blocks are accommodated in the mounting grooves.

Optionally, portions, corresponding to the four corners of the mobile terminal, of the middle frame are bent back to the rear shell, and the buffer elastic block is arranged between the bending portion of the middle frame and the rear shell.

Optionally, the middle frame is made of a polymer material or a metal alloy.

Optionally, the detection module comprises: an acceleration sensor configured to detect a movement acceleration of the mobile terminal; and a controller configured to judge whether the mobile terminal is in a drop state according to an acceleration detected by the acceleration sensor, and send a control signal to the elastic block control unit according to a judgment result.

Optionally, the mobile terminal further comprises an alarm apparatus configured to issue an alarm if the buffer elastic block is ejected out.

Optionally, the mobile terminal further comprises an elastic block position detection module configured to detect whether the buffer elastic block is reset; and the alarm apparatus is further configured to stop alarming if the elastic block position detection module detects that the buffer elastic block is reset.

Optionally, the elastic block position detection module is a pressure sensor.

There is further provided in at least one embodiment of the present disclosure a drop protection method of a mobile terminal, the following steps:

judging whether the mobile terminal is in a drop state; and
controlling a buffer elastic block to eject out if the mobile terminal is in the drop state.

Optionally, the step of judging whether the mobile terminal is in the drop state comprises the following steps:

acquiring a movement acceleration of the mobile terminal currently; and
judging that the mobile terminal is in the drop state if the movement acceleration of the mobile terminal is g.

Optionally, the method comprises the following step:
issuing an alarm if the buffer elastic block is controlled to eject out.

Optionally, the method further comprises the following step:
detecting whether the buffer elastic block is reset, and stopping alarming if the buffer elastic block is reset.

BRIEF DESCRIPTION OF THE DRAWINGS

FIG. 1b is a schematic view of an A-A cross section of the mobile terminal illustrated in FIG. 1a;

FIG. 2b is a schematic view of an A-A cross section of the mobile terminal illustrated in FIG. 2a;

DETAILED DESCRIPTION

To make the principle and advantages of the present disclosure clearer, hereinafter the embodiments of the present disclosure are further described in detail with reference to the accompanying drawings.

At present, there is a mobile terminal having an automatic drop protection function. The mobile terminal is additionally provided with a detection apparatus for detecting the drop of the mobile terminal and at least one shock absorption apparatus, where the shock absorption apparatus is accommodated in the shell of the mobile terminal and includes protection contact ends and springs. When the detection apparatus detects that the mobile terminal is dropped, the protection contact ends in the shell are ejected out and then subjected to the shocks before the rear shell of the mobile terminal. In this way, the screen or the rear shell of the mobile terminal is prevented from being damaged. In the meantime, the protection contact ends may absorb the momentum caused by drop of the mobile terminal, such that the internal module or devices in the mobile terminal can be effectively protected.

The inventors found that there are at least the following problems in the above situations. The protection contact ends in the shock absorption apparatus have a rod-shaped structure, the strength of which is very poor, thus when it collides with the ground, the protection contact ends may be deformed or even fractured. In addition, when the protection contact ends with the rod-shaped structure absorb the momentum caused by the drop of the mobile terminal, a greater stress may be generated inside the shell of the mobile terminal, causing a stress concentration, and resulting in damage inside the shell.

Figure 1A:
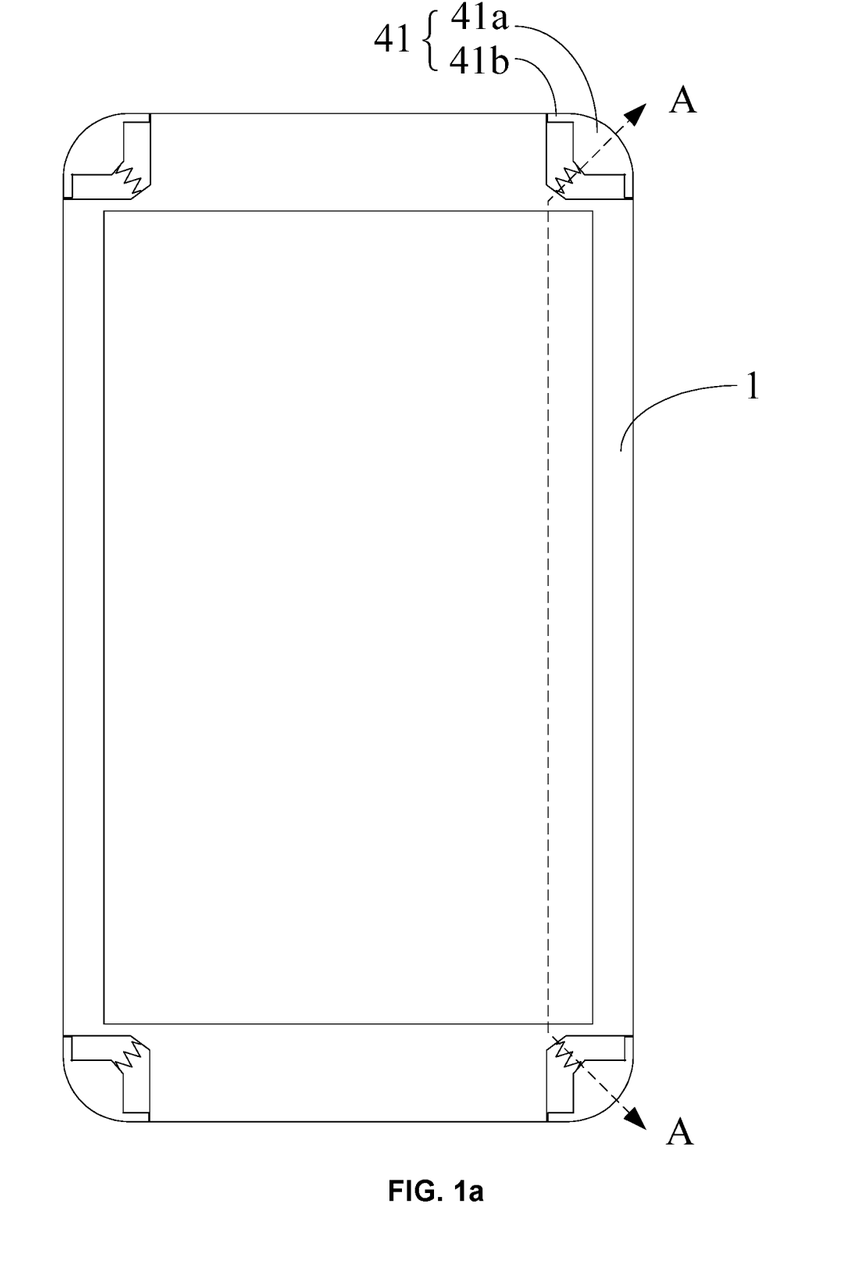
FIG. 1a is a schematic view of a structure of a mobile terminal according to an embodiment of the present disclosure.
Figure 1B:
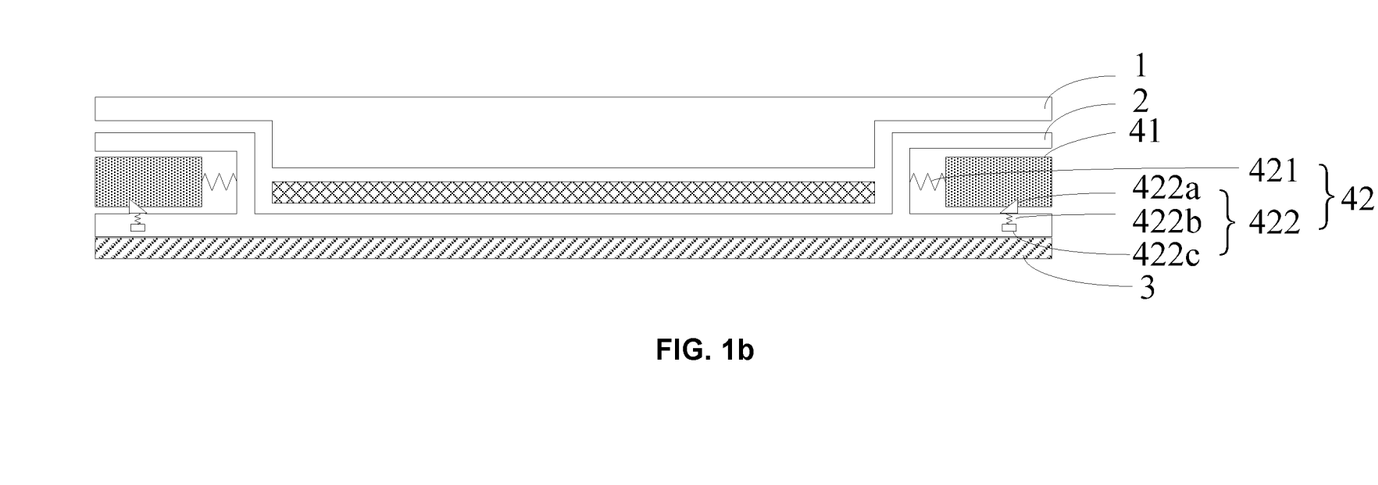

FIG. 1a is a schematic view of a structure of a mobile terminal according to an embodiment of the present disclosure, and FIG. 1b is a schematic view of an A-A cross section of the mobile terminal illustrated in FIG. 1a. As illustrated in FIGS. 1a and 1b, the mobile terminal includes a display panel 1, a middle frame 2 and a rear shell 3. The middle frame 2 is mounted in the rear shell 3, and the display panel 1 is arranged on the middle frame 2.

The mobile terminal further includes a detection module 5 (referring to FIG. 5) and a protection module. Herein, the detection module is configured to detect whether the mobile terminal is in a drop state. The protection module includes a buffer elastic block 41 and an elastic block control unit 42. The buffer elastic block 41 is mounted on the middle frame 2. The elastic block control unit 42 is configured to control the buffer elastic block 41 to eject out if the detection module detects that the mobile terminal is in the drop state.

In an implementation, the mobile terminal may be a mobile phone, a tablet computer, a television, a display, a laptop computer, a navigator or the like.

According to the embodiments of the present disclosure, a buffer elastic block, an elastic block control unit and a detection module are arranged in a mobile terminal. When the detection module detects that the mobile terminal is in a drop state, the elastic block control unit controls the buffer elastic block to eject out. At the instant of dropping down to the ground, the butter elastic block may absorb the momentum generated during the drop of the mobile terminal and reduce an instantaneous shock stress on the mobile terminal, thereby achieving a purpose of protecting the internal module of the mobile terminal. Since the contact area between the buffer elastic block and the ground is large, the buffering effect is better and a concentration stress does not occur. In addition, since the buffer elastic block is arranged on the middle frame, when a force is applied to the buffer elastic block, the force may be transferred to middle frame, and the middle frame may further play a buffering function, thereby better protecting the mobile terminal and avoiding the damages to the screen and the internal modules due to the drop of the mobile terminal.

Further, as shown in FIG. 1b, the elastic block control unit 42 includes a buffer spring 421 and an electromagnetic drive limiting mechanism 422. One end of the buffer spring 421 is connected to the buffer elastic block 41, and the other end of the buffer spring 421 is connected to the middle frame 2. The electromagnetic drive limiting mechanism is mounted in the middle frame 2, and the electromagnetic drive limiting mechanism 422 is configured to seize or release the buffer elastic block 41. When the electromagnetic drive limiting mechanism 422 releases the buffer elastic block 41, the buffer elastic block 41 is ejected out under an elastic force of the buffer spring 421. Therefore, the structure is simple and easy to implement.

In another implementation of the embodiments, the electromagnetic drive limiting mechanism 422 includes an electromagnet 422a, a connection spring 422b and a limiting block 422c. The limiting block 422c is provided with a ferromagnet cooperated with the electromagnet 422a. The buffer elastic block 41 is provided with a limiting groove cooperated with the limiting block 422c. When the electromagnet is employed to drive the stop block 422c having a small volume to move, only a small force is required therein. In this way, the volume of the electromagnet 422a can be reduced, and the inner space of the mobile terminal may be saved. The electromagnet is used for driving the block 422c to move, and thus the structure is simple, thereby saving the internal space of the mobile terminal. Besides, the electromagnet reacts quickly, which is beneficial to the rapid ejection of the buffer block.

In another implementation of the embodiments, the electromagnet 422a may also be arranged on the middle frame 2, and the ferromagnet may be arranged on the buffer elastic block 41, such that the buffer elastic block 41 may be directly driven to move via the electromagnet 422a.

Figure 2A:
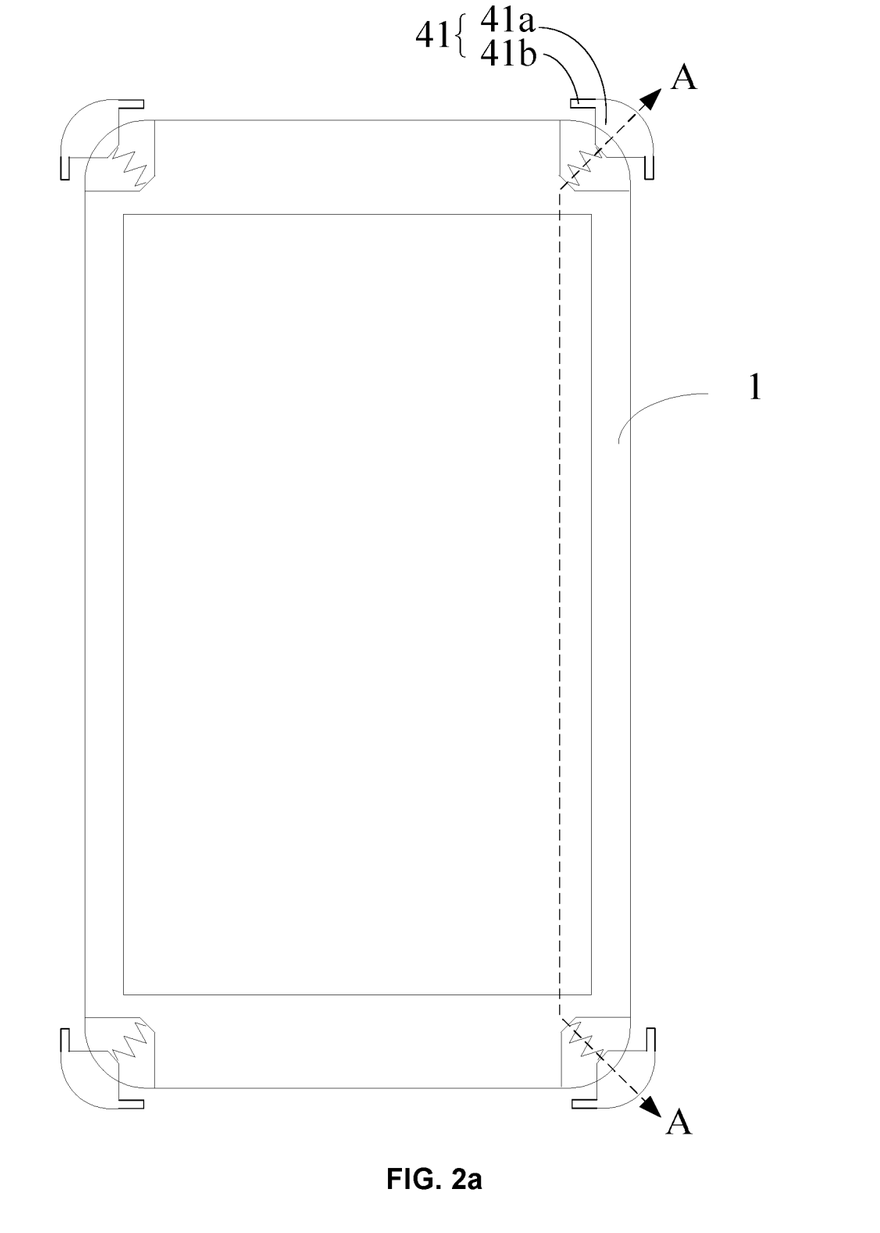
FIG. 2a is a schematic view of a structure of a mobile terminal when a buffer elastic block is ejected according to an embodiment of the present disclosure.
Figure 2B:
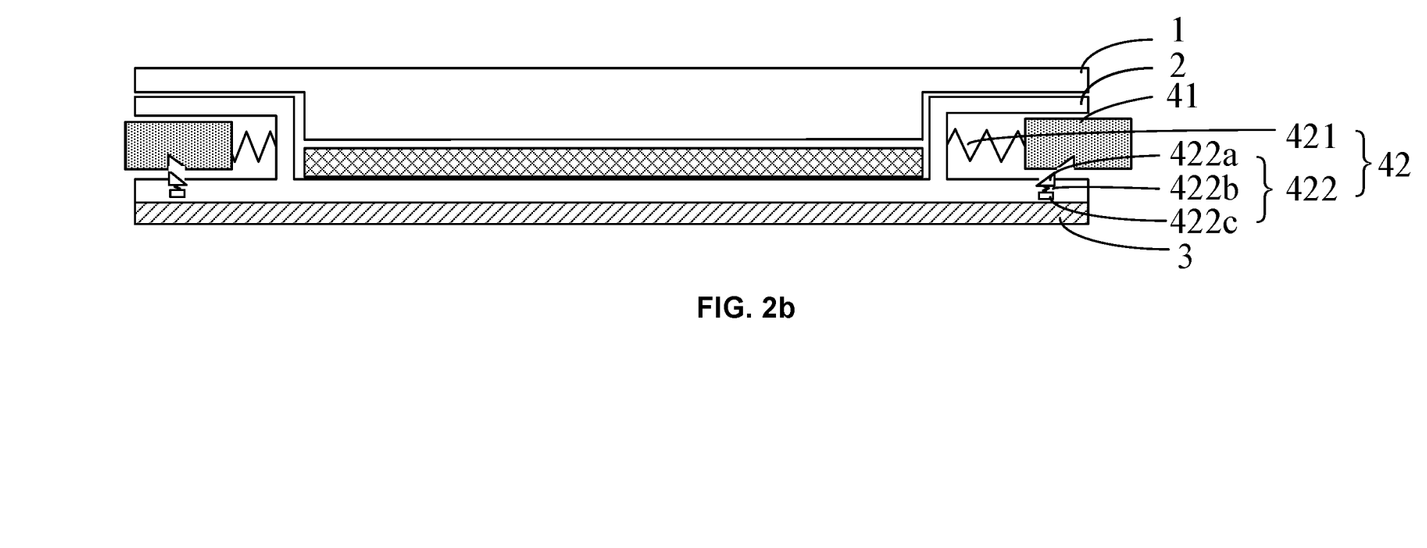

FIG. 2a and FIG. 2b show a state when the buffer elastic block of the mobile terminal is ejected out. As shown in FIG. 2b, the electromagnet 422a is powered on to absorb the ferromagnet on the limiting block 422c, such that the limiting block 422c is disengaged from the limiting groove of the buffer elastic block 41. At this time, without the blocking of the limiting block 422c, the buffer elastic block 41 can be ejected from the middle frame 2 under the elastic force generated by the buffer spring 421.

It should be noted that in the embodiments, the limiting block 422c is a triangular prism, and in other embodiments, the limiting block 422c may also be a cube, a cuboid or the like, which is not limited in the embodiments of the present disclosure.

Herein, the buffer elastic block 41 may be made of a flexible material, for example, a rubber. The buffer elastic block made of the flexible material can better protect the mobile terminal.

Further, as illustrated in FIG. 1a and FIG. 2a, the buffer elastic block 41 includes an elastic block body 41a and two support arms 41b extending from two sides of the elastic block body 41a. The buffer spring 421 is connected to the elastic block body 41a and is located between the two support arms 41b.

In the embodiments, the elastic block body 41a is a block structure with a fan-shaped cross section (a section parallel to the display panel), a radian of an arc surface thereof may be the same as radians of the four corners of the mobile terminal, and a side surface of the elastic block body 41a opposite to the arc surface is connected to the buffer spring 421. The two support arms 41b extend towards the two sides of the elastic block body 41a along a bending direction of the arc surface of the elastic block body 41a. As illustrated in FIG. 1a, when the buffer elastic block 41 is accommodated in the mobile terminal, an outer side wall (a side wall facing towards an exterior of the mobile terminal) of the buffer elastic block 41 and an outer side wall of the mobile terminal are integrally connected and smoothly transitioned, which is convenient for the user to hold or carry the mobile terminal.

Figure 3:
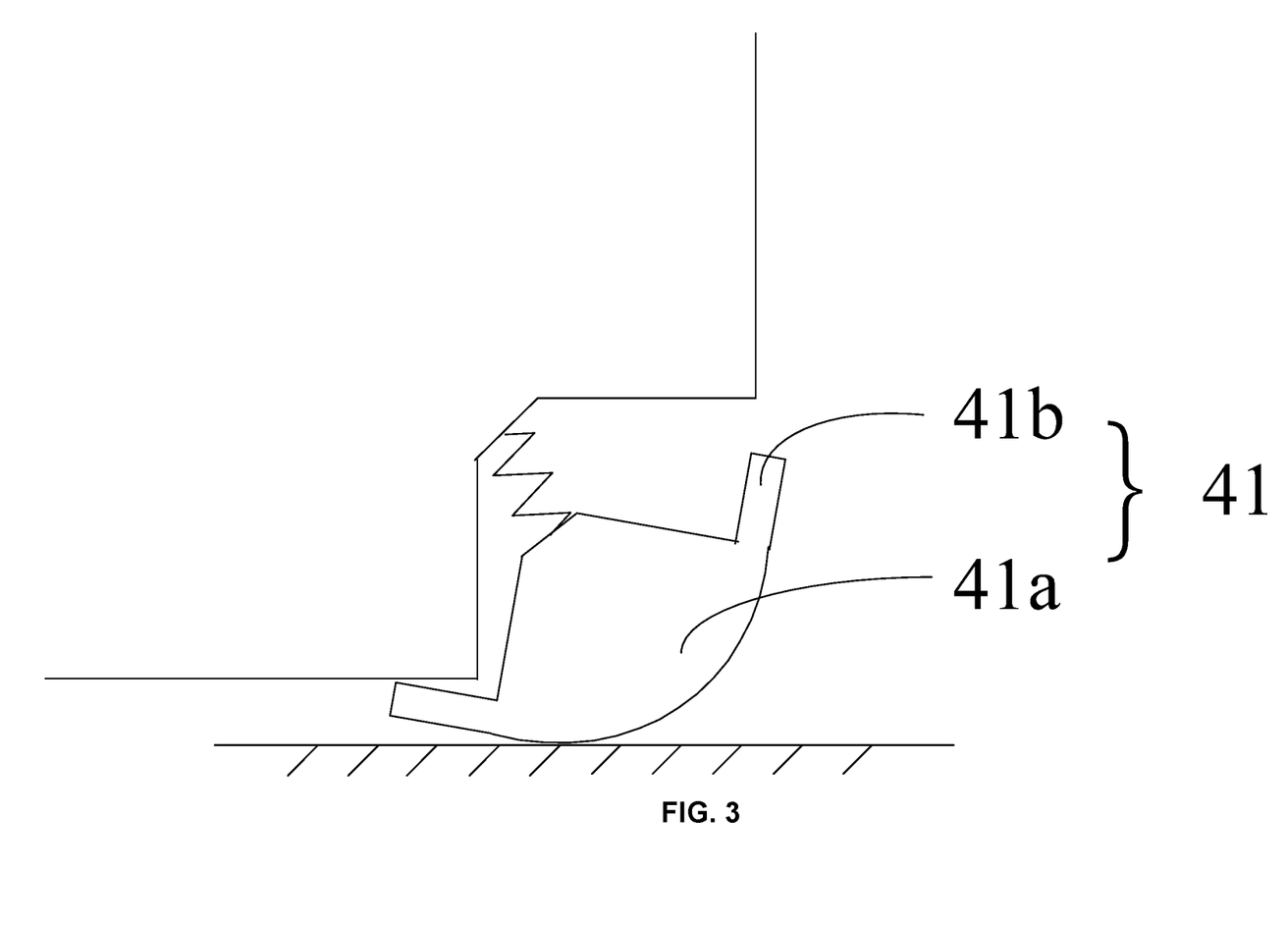
FIG. 3 is a schematic view of a mobile terminal after a buffer elastic block thereof is ejected and offset according to an embodiment of the present disclosure.

When the elastic block 41 is ejected, the buffer elastic block 41 is pressed against the ground at the instant when the mobile terminal drops down to the ground, and thus the buffer elastic block 41 may move towards two sides of the mobile terminal parallel to the display panel 1. FIG. 3 is a schematic view of the mobile terminal after the buffer elastic block is ejected and offset according to an embodiment of the present disclosure. As illustrated in FIG. 3, when the mobile terminal is in contact with the ground and then falls down towards the left side, the support arm 41b on the left side of the buffer elastic block 41 may be clamped between the mobile terminal and the ground, thereby preventing the side of the mobile terminal from being in contact with the ground, avoiding the side of the mobile terminal being scratched, and achieving an effect of secondary buffer.

It should be noted that in the illustrated structure, a gap defined between the buffer elastic block 41, and the middle frame 2 and the rear shell 3 is merely illustrative and is not intended to limit an actual size of the gap. Although in the illustrated structure, the gap defined between the buffer elastic block 41, and the middle frame 2 and the rear shell 3 is large, in practice, the gap between the buffer elastic block 41, and the middle frame 2 and the rear shell 3 is small enough to prevent the dusts from entering the mobile terminal.

Further, as illustrated in FIG. 1a and FIG. 2a, the four corners of the mobile terminal are each provided with a buffer elastic block 41 and an elastic block control unit 42. During the drop of the mobile terminal, the mobile terminal is most likely to be damaged when any of the four corners thereof is landed against the ground, thus the mobile terminal can be better protected if the buffer elastic blocks 41 are arranged at each of the four corners.

Further, an ejection direction of the buffer elastic block 41 is parallel to the display panel 1. When the buffer elastic block 41 is ejected out along a direction parallel to the display panel 1, the sides of the mobile terminal can be effectively protected from being in contact with the ground, which reduces the damages to the outer surface of the mobile terminal.

Further, as illustrated in FIG. 1b and FIG. 2b, four mounting grooves corresponding to the four corners of the mobile terminal are arranged on the middle frame 2, and the buffer elastic blocks 41 are received in the mounting grooves. In this case, the middle frame 2 has a greater thickness at least at the four corners, to receive the buffer elastic blocks 41. When the mobile terminal is dropped, the buffer elastic block 41 is in contact with the ground, and the ground may exert a counterforce against the buffer elastic block 41. The counterforce may act on the middle frame 2 via the buffer elastic block 41 and the buffer spring 421, and the middle frame 2 may be functioned as a buffer, such that the force applied to the interior of the mobile terminal is further reduced. In this way, the mobile terminal may be better protected, thereby avoiding the problems of damages to the screen and the internal modules due to drop of the mobile terminal.

Optionally, the middle frame 2 may be made of a polymer material such as a plastic, or a metal alloy.

Figure 4:
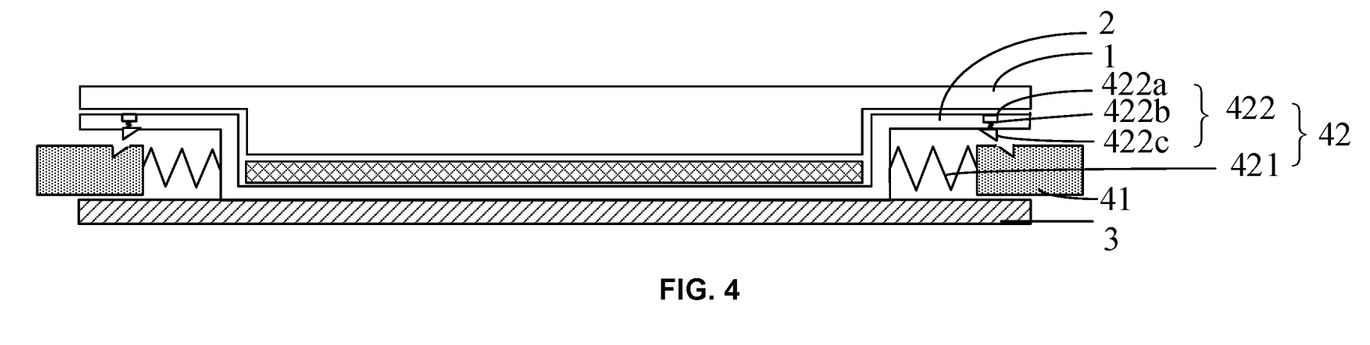
FIG. 4 is a schematic view of an A-A cross sectional of another mobile terminal after a buffer elastic block thereof is ejected according to an embodiment of the present disclosure.

FIG. 4 is a schematic view of an A-A cross section of another mobile terminal after a buffer elastic block thereof is ejected out according to an embodiment of the present disclosure. As illustrated in FIG. 4, the structure of the mobile terminal is substantially the same as the structure of the mobile terminal as illustrated in FIG. 2b, while the difference is that the middle frame 2 in the embodiment is entirely thinner, portions, corresponding to the four corners of the mobile terminal, of the middle frame 2 are bent back to the rear shell 3, and the buffer elastic block 41 is arranged between the bending portions of the middle frame 2 and the rear shell 3. After the bending of the middle frame 2, a buffer elastic block 41 is arranged between the bent middle frame 2 and the rear shell 2, which is advantages for reducing the thickness of the middle frame 2 and further reducing the thickness of the mobile terminal.

Figure 5:
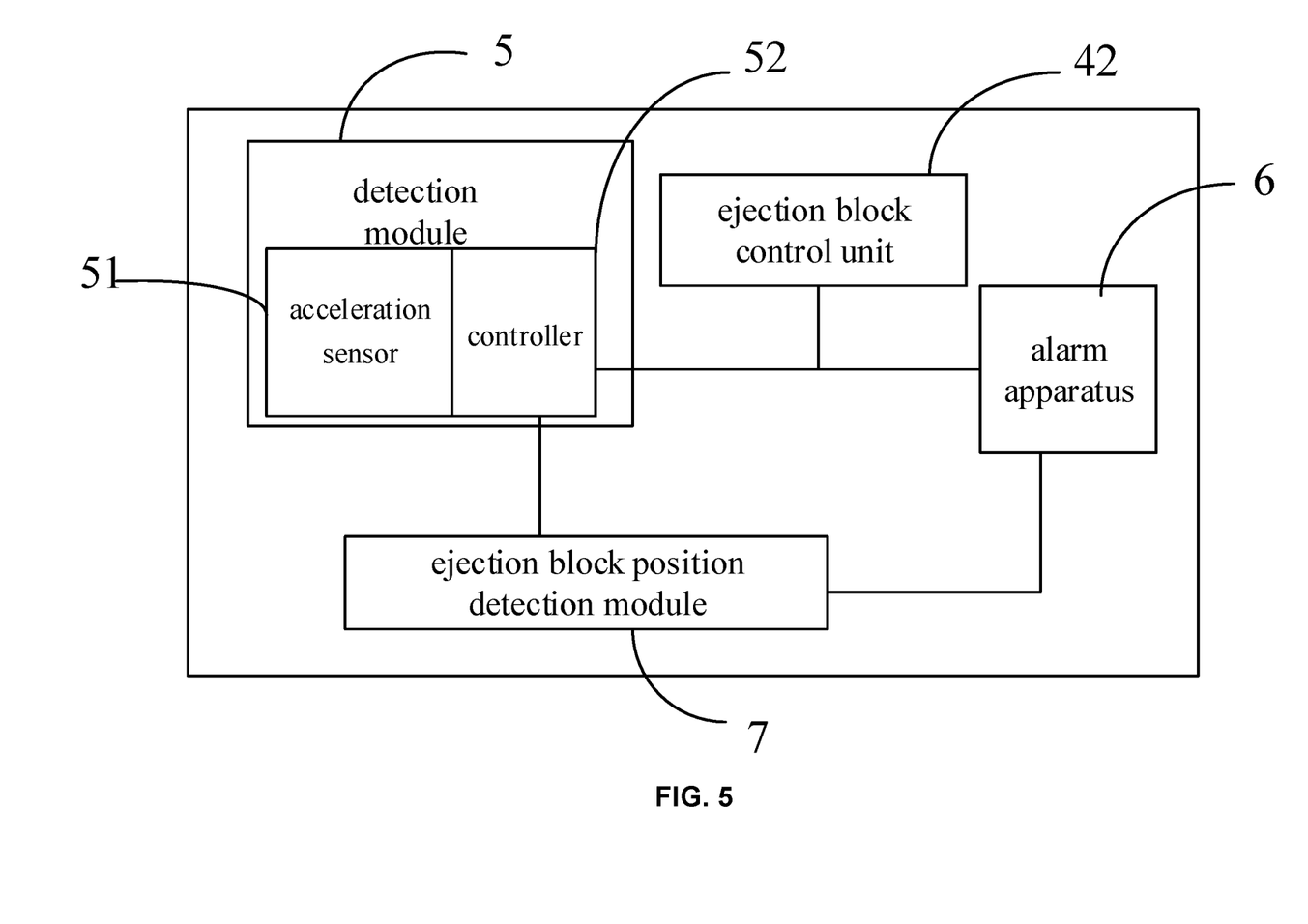
FIG. 5 is a schematic view of a structure of an electric connection of a mobile terminal according to an embodiment of the present disclosure.

FIG. 5 is a schematic view of a structure of an electric connection of a terminal device according to an embodiment of the present disclosure. As illustrated in FIG. 5, a detection module 5 includes an acceleration sensor 51 for detecting a movement acceleration of the mobile terminal; and a controller 52 for judging whether the mobile terminal is in a drop state according to an acceleration detected by the acceleration sensor 51, and sending a control signal to the elastic block control unit 42 according to a judgment result. At present, most of the mobile terminals are provided with the acceleration sensor 51 and the controller 52. Judgment on whether the mobile terminal is in the drop state by using the acceleration sensor 51 and the controller 52 may be implemented based on existing devices of the mobile terminal, without additional hardware, which is favorable to promotion and application.

Further, the mobile terminal further includes an alarm apparatus 6 for generating an alarm when the buffer elastic block 41 is ejected out. In practice, the alarm apparatus 6 may be one or more of a buzzer, a display and an indicator. When the buffer elastic block 41 is ejected out, an alarm is issued by the alarm apparatus 6 to notify a user of a mobile terminal that the mobile terminal has dropped.

Further, the mobile terminal further includes an elastic block position detection module 7 for detecting whether the buffer elastic block 41 is reset.

Exemplarily, the elastic block position detection module 7 in the embodiments can be a pressure sensor, which is arranged at the bottom of the buffer spring 421 and is configured to detect a pressure at the bottom of the buffer spring 421. After the buffer spring 421 is reset, the pressure at the bottom of the buffer spring 421 may be increased, and when the pressure increases to a certain value, it can be judged that the buffer elastic block 41 is reset. In other embodiments of the present disclosure, the elastic block position detection module 7 may also be a displacement sensor, an infrared sensor or the like.

It should be noted that each buffer elastic block 41 is correspondingly provided with an elastic block position detection module 7, so as to more accurately detect whether each buffer elastic block 41 is reset. When each elastic block position detection module 7 detects that buffer elastic block 41 is reset, the alarming is stopped, thereby avoiding the problem that the mobile terminal cannot be protected until the mobile terminal drops next time, due to that the user fails to notice that the buffer elastic block 41 is still in an ejection-out state.

Figure 6:
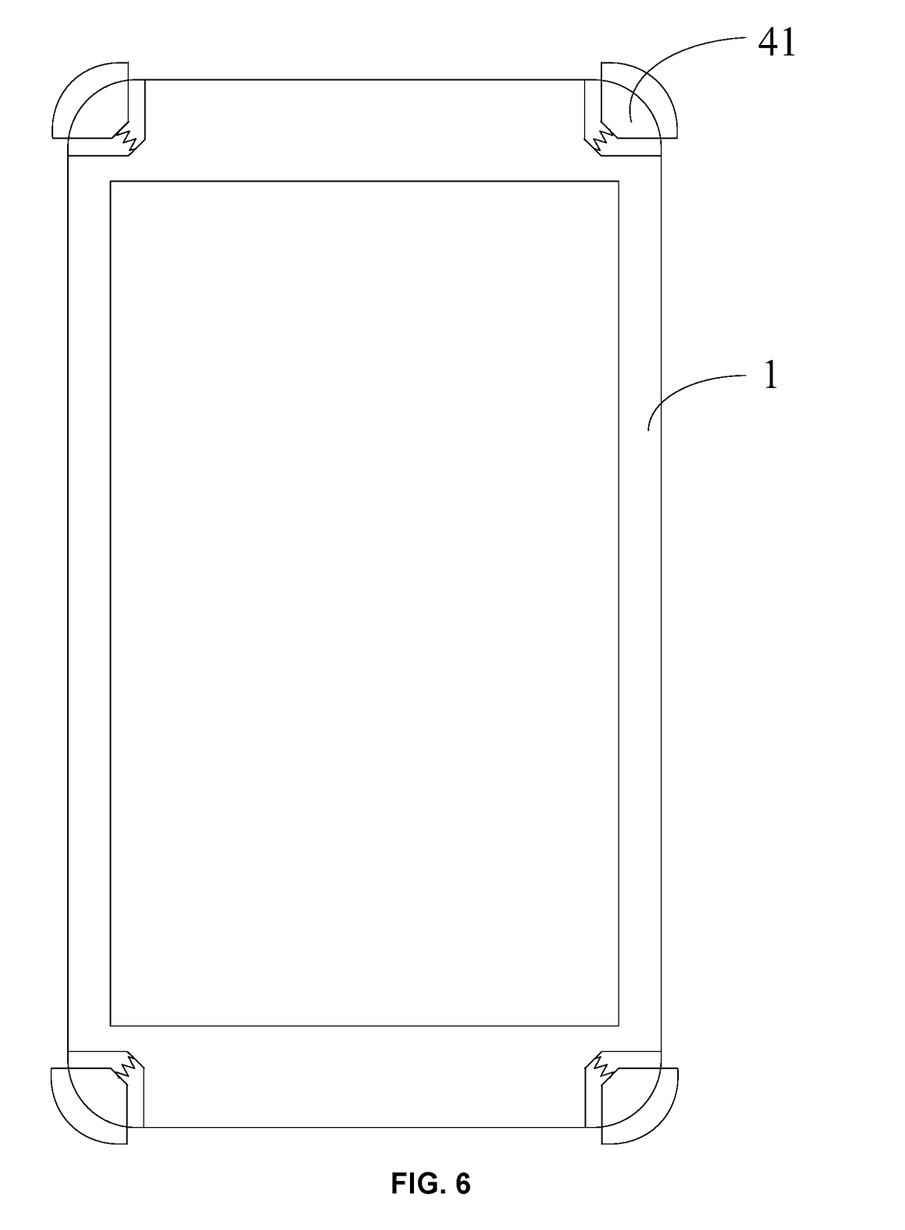
FIG. 6 is a schematic view of a structure of another mobile terminal according to an embodiment of the present disclosure.

There is further provided in an embodiment of the present disclosure another mobile terminal. FIG. 6 is a schematic view of a structure of another mobile terminal according to the present disclosure. The structure of the mobile terminal as illustrated in FIG. 6 is substantially the same as the structure of the mobile terminals as illustrated in FIGS. 1a-1b and FIGS. 2a-2b, except for a different structure of the buffer elastic block 41 therein.

Exemplarily, as illustrated in FIG. 6, the buffer elastic block 41 is a block structure with a fan-shaped cross section, a radian of an arc surface thereof is the same as radians of the four corners of the mobile terminal, and a side surface of the elastic block 41 opposite to the arc surface is connected to the buffer spring 421.

It should be noted that the specific shape of the buffer elastic block 421 may be selected according to the actual needs, for example, a block structure with a diamond-shaped cross section or a polygon cross section.

Figure 7:
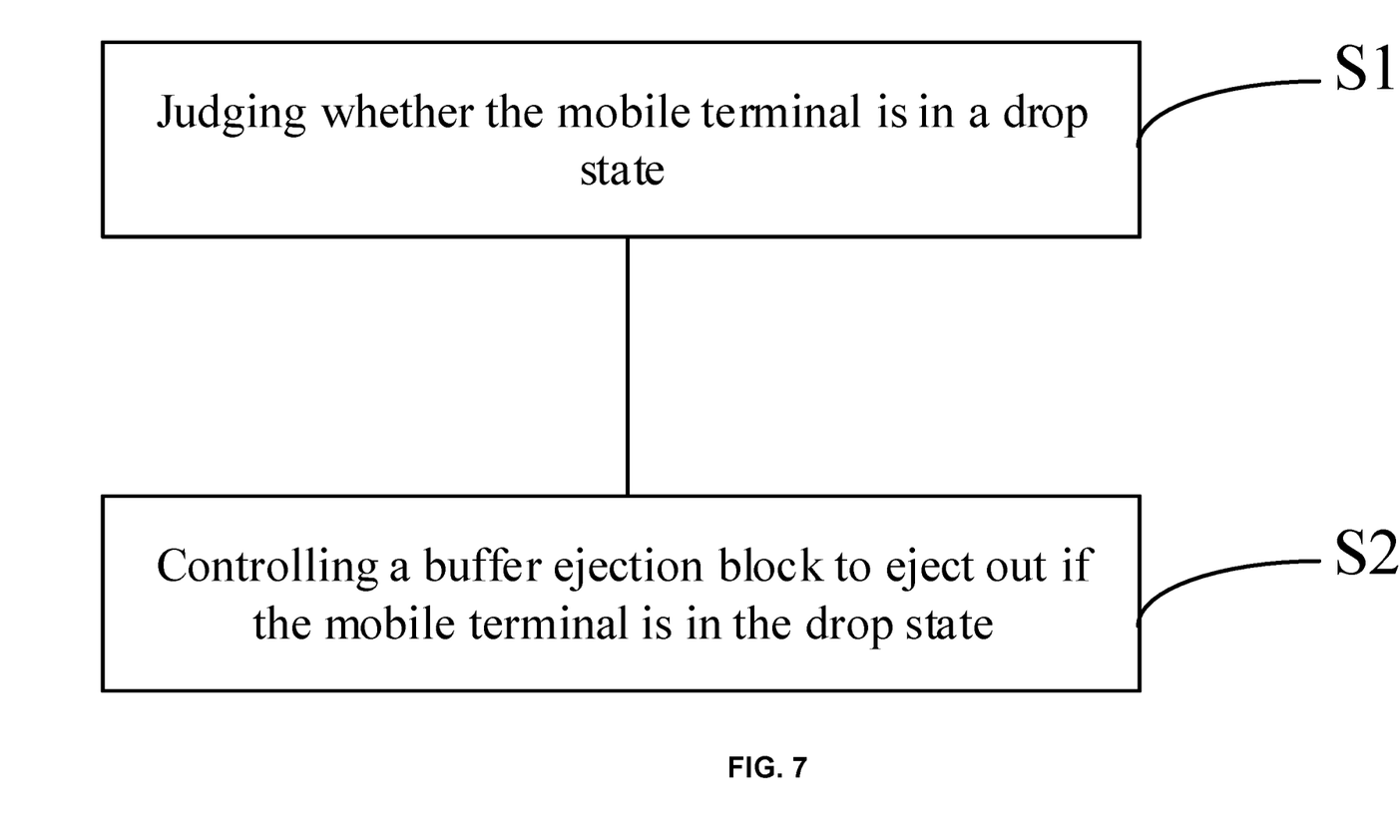
FIG. 7 is a flowchart of a drop protection method of a mobile terminal according to an embodiment of the present disclosure.

There is further provided in an embodiment of the present disclosure a drop protection method of a mobile terminal. The method is applied to the mobile terminal described in the above embodiments. FIG. 7 is a flowchart of a drop protection method of a mobile terminal according to an embodiment of the present disclosure. As illustrated in FIG. 7, the method includes the following steps.

In step S1, whether the mobile terminal is in a drop state is judged.

Exemplarily, a movement acceleration of the current mobile terminal is acquired by using an acceleration sensor in a detection module. When the movement acceleration of the mobile terminal is g, it is judged that the mobile terminal is in a drop state; and when the movement acceleration of the mobile terminal is not g, it is judged that the mobile terminal is not in the drop state.

In step S2, a buffer elastic block is controlled to eject out if the mobile terminal is in the drop state.

Exemplarily, if it is judged that the mobile terminal is in the drop state, a controller sends a control signal to an elastic block control unit, so as to control a buffer elastic block to be ejected, such that the mobile terminal can be protected when dropped down to the ground.

It is easy to know that the step S1 is repeatedly executed if the mobile terminal is not in the drop state.

Further, the method may further include the following step.

An alarm is issued after the buffer elastic block is controlled to eject out, so as to notify a user that the mobile terminal drops. Exemplarily, after sending a control signal to an elastic block control unit, the controller sends an instruction signal to an alarm apparatus, such that the alarm apparatus starts to alarm upon receiving the instruction signal.

Further, the method may further include the following steps: detecting whether the buffer ejection is reset, and stopping alarming if the buffer elastic block is reset. While stopping the alarming, a limiting bock of the elastic block control unit is controlled to eject out, so as to limit the buffer elastic block.

The embodiments illustrated in FIGS. 1-6 are taken as examples for brief description. After the buffer elastic block 41 is ejected out, the alarm apparatus 6 issues an alarm. When taking the mobile terminal, a user may manually press the buffer elastic block 41 to reset it. After an elastic block position detection module 7 detects that all the buffer elastic blocks 41 have been reset, an instruction signal is sent to the controller 52. The controller 52 controls the alarm apparatus 6 to stop alarming, and sends a control signal to control the elastic block control unit 42. An electromagnet 422a is powered off, and a magnetic force between the electromagnet 422a and the limiting block 422c is disappeared. The limiting block 422c is ejected out to limit the buffer elastic block 41.

The foregoing descriptions are merely exemplary embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A mobile terminal, comprising a display panel, a middle frame, a rear shell, a protection module and a detection module; wherein the middle frame is in the rear shell, and the display panel is on the middle frame; the protection module comprises a buffer elastic block and an elastic block control unit, the buffer elastic block is on the middle frame, and the elastic block control unit is configured to control the buffer elastic block to eject out if the detection module detects that the mobile terminal is in a drop state,
   wherein the elastic block control unit comprises a buffer spring and an electromagnetic drive limiting mechanism; one end of the buffer spring is connected to the buffer elastic block, the other end of the buffer spring is connected to the middle frame, the electromagnetic drive limiting mechanism is on the middle frame, and the electromagnetic drive limiting mechanism is configured to perform one of seizing and releasing of the buffer elastic block, and
   wherein the buffer elastic block comprises an elastic block body and two support arms extending from two sides of the elastic block body; and the buffer spring is connected to the elastic block body and is between the two support arms.

2. The mobile terminal according to claim 1, wherein the electromagnetic drive limiting mechanism comprises an electromagnet, a connection spring and a limiting block; wherein the limiting block is provided with a ferromagnet cooperated with the electromagnet, and the buffer elastic block is provided with a limiting groove cooperated with the limiting block.

3. The mobile terminal according to claim 1, wherein a section of the elastic block body parallel to the display panel is fan-shaped.

4. The mobile terminal according to claim 3, wherein the two support arms extend towards the two sides of the elastic block body along a bending direction of an arc surface of the elastic block body, and when the buffer elastic block is in the mobile terminal, an outer side wall of the buffer elastic block and an outer side wall of the mobile terminal are integrally connected and smoothly transitioned.

5. The mobile terminal according to claim 1, wherein the buffer elastic block is made of a flexible material.

6. The mobile terminal according to claim 1, wherein four corners of the mobile terminal are each provided with a buffer elastic block and an elastic block control unit.

7. The mobile terminal according to claim 1, wherein an ejection direction of the buffer elastic block is parallel to the display panel.

8. The mobile terminal according to claim 1, wherein four mounting grooves, corresponding to the four corners of the mobile terminal, are on the middle frame, and the buffer elastic blocks are in the mounting grooves.

9. The mobile terminal according to claim 1, wherein portions, corresponding to the four corners of the mobile terminal, of the middle frame are bent back to the rear shell, and the buffer elastic block is between the bending portion of the middle frame and the rear shell.

10. The mobile terminal according to claim 1, wherein the middle frame is made of one of a polymer material and a metal alloy.

11. The mobile terminal according to claim 1, wherein the detection module comprises: an acceleration sensor configured to detect a movement acceleration of the mobile terminal; and a controller configured to judge whether the mobile terminal is in a drop state according to an acceleration detected by the acceleration sensor, and send a control signal to the elastic block control unit according to a judgment result.

12. The mobile terminal according to claim 11, wherein the mobile terminal further comprises an alarm apparatus configured to issue an alarm if the buffer elastic block is ejected out.

13. The mobile terminal according to claim 12, wherein the mobile terminal further comprises an elastic block position detection module configured to detect whether the buffer elastic block is reset; and
the alarm apparatus is further configured to stop alarming if the elastic block position detection module detects that the buffer elastic block is reset.

14. The mobile terminal according to claim 13, wherein the elastic block position detection module is a pressure sensor.

15. A drop protection method of a mobile terminal, the mobile terminal comprising a display panel, a middle frame, a rear shell, a protection module and a detection module; wherein the middle frame is in the rear shell, and the display panel is on the middle frame; the protection module comprises a buffer elastic block and an elastic block control unit, the buffer elastic block is on the middle frame, and the elastic block control unit is configured to control the buffer elastic block to eject out if the detection module detects that the mobile terminal is in a drop state,
wherein the elastic block control unit comprises a buffer spring and an electromagnetic drive limiting mechanism; one end of the buffer spring is connected to the buffer elastic block, the other end of the buffer spring is connected to the middle frame, the electromagnetic drive limiting mechanism is on the middle frame, and the electromagnetic drive limiting mechanism is configured to perform one of seizing and releasing of the buffer elastic block, and
wherein the buffer elastic block comprises an elastic block body and two support arms extending from two sides of the elastic block body; and the buffer spring is connected to the elastic block body and is between the two support arms, and
wherein the method comprises the following steps:
judging whether the mobile terminal is in the drop state; and
controlling the buffer elastic block to eject out if the mobile terminal is in the drop state.

16. The method according to claim 15, wherein the step of judging whether the mobile terminal is in the drop state comprises the following steps:
acquiring a movement acceleration of the mobile terminal currently; and
judging that the mobile terminal is in the drop state if the movement acceleration of the mobile terminal is g.

17. The method according to claim 15, further comprising the following step:
issuing an alarm if the buffer elastic block is controlled to eject out.

18. The method according to claim 17, further comprising the following step:
detecting whether the buffer elastic block is reset, and stopping alarming if the buffer elastic block is reset.

19. The mobile terminal according to claim 1, wherein the buffer elastic block is configured to press against a ground in response to the mobile terminal dropping down to the ground, and move towards two sides of the mobile terminal parallel to the display panel, so that one of the support arms of the buffer elastic block is clamped between the mobile terminal and the ground, thereby preventing the side of the mobile terminal from being in contact with the ground.

20. The mobile terminal according to claim 1, wherein one of the support arms is in contact with a side of the mobile terminal and the ground when the mobile terminal drops down to the ground.

* * * * *